United States Patent [19]

Maxey, Sr. et al.

[11] 3,922,791

[45] Dec. 2, 1975

[54] PROFILE INDICATING APPARATUS DISPLACEABLE EITHER ALONG AN AXIS OR IN A PLANE PERPENDICULAR THERETO

[75] Inventors: Robert E. L. Maxey, Sr., North Huntingdon; John Bernard, Jr., Pittsburgh, both of Pa.

[73] Assignee: Westinghouse Electric Corporation, Pittsburgh, Pa.

[22] Filed: Sept. 16, 1974

[21] Appl. No.: 506,650

[52] U.S. Cl. ............. 33/172 R; 33/174 L; 33/174 P
[51] Int. Cl.² ...................... G01B 5/20; G01B 7/28
[58] Field of Search .......... 33/169 R, 172 R, 172 E, 33/174 R, 174 L, 174 P, 174 PC

[56] References Cited
UNITED STATES PATENTS

| | | | |
|---|---|---|---|
| 3,520,063 | 7/1970 | Rethwish et al. ................. | 33/169 R |
| 3,571,934 | 3/1971 | Buck, Sr. ......................... | 33/169 R |
| 3,660,906 | 5/1972 | Zimmerman ...................... | 33/174 L |
| 3,673,695 | 7/1972 | Rethwish ........................... | 33/174 L |
| 3,766,653 | 10/1973 | McKay, Sr. ...................... | 33/174 L |

FOREIGN PATENTS OR APPLICATIONS

| | | | |
|---|---|---|---|
| 1,494,945 | 8/1967 | France .............................. | 33/174 L |

OTHER PUBLICATIONS

D. W. Savage, "Multi-directional Probe," Western Electric Technical Dig. No. 6, April 1967.

*Primary Examiner*—Richard E. Aegerter
*Assistant Examiner*—Richard R. Stearns
*Attorney, Agent, or Firm*—George M. Medwick

[57] ABSTRACT

Profile-indicating apparatus having a sensing head displaceable either along an axis through the apparatus or in a plane perpendicular thereto. Abutting contact between the sensing head and irregularities on the surface of a profiled workpiece exert forces on the sensing head acting to deflect the head either along the apparatus axis or in the plane perpendicular thereto. A force transmission arrangement translates the force acting on the sensing head to a force directed along the axis of the apparatus to cause rectilinear and rotational displacement of a shaft mounted within the apparatus housing. Recording and, display instruments, also mounted within the apparatus housing, utilize either the rectilinear or rotational movement of the shaft as inputs to provide an accurate measurement of the deflections of the sensing head, and therefore, the irregularities on the profiled surface of the workpiece.

6 Claims, 7 Drawing Figures

PROFILE INDICATING APPARATUS DISPLACEABLE EITHER ALONG AN AXIS OR IN A PLANE PERPENDICULAR THERETO

BACKGROUND OF THE INVENTION

1. Field of the Invention

This invention relates to profile indicating apparatus, and in particular, to apparatus displaceable either along an axis or in a plane perpendicular thereto for accurately measuring the contour profile of a machined workpeice.

2. Description of the Prior Art

At present, irregularly contoured workpieces are machined through the use of a numerically controlled machine spindle having an appropriate cutting head thereon. The workpiece is usually mounted upon a worktable and the cutting thereof performed by a machine tool following instructions provided by a numerical control tape. There is, at the present time, no device which can check the complete contour of an irregularly shaped workpiece both over a 360° continuous path around a surface of the workpiece lying parallel to an axis extending through the cutting device and over the surfaces of the workpiece disposed perpendicular to the axis of the device that does not require removal of the workpiece from the worktable. Although the contour can be machined by a numerically controlled, continuous path machine, it cannot be checked for accuracy by having the machine retrace the contour.

The presently used checking methods require removal of the workpiece from the table, and the application of several independent radius gauges, micrometers, and depth gauges to verify the profile. It is readily apparent that a number of independent set-ups must be used before the checking can be done. This, is, of course, time consuming and expensive. Although U.S. Pat. No. 3,673,695, provides a contour checking device that is alternatively movable along an axis therethrough or in a plane perpendicular to that axis, it is apparent that requiring interruption of the checking procedure to manually change from one degree of freedom to another, as required by prior art devices, is cumbersome and tedious.

It is advantageous to provide a device for precisely checking the dimensions of a contoured workpiece along to complete 360° continuous path about a surface of the workpiece lying parallel to the apparatus axis and a surface of the workpiece lying perpendicular thereto without the necessity of removing the workpiece from the table. It is also advantageous to eliminate the separate set-ups and gauge checks used in the prior art and, instead, check the workpiece profile using the same numerical control machine running under the same numerical control tape which originally machined the profile. Further, it is desirable to provide an apparatus which is displaceable along an axis extending therethrough and in a plane perpendicular to that axis without being required to change the setting on the apparatus in order to change from motion along the axis to motion in a plane perpendicular thereto.

SUMMARY OF THE INVENTION

The profile apparatus taught by the invention permits accurate checking of a profile on surfaces of a workpiece that are parallel to and perpendicular to the axis of the apparatus without necessitating removal of the workpiece from the worktable and without requiring a switching of the apparatus to permit motion along the axis to motion in a plane perpendicular thereto. The apparatus taught by this invention is guided over the surface of the member by the same numerically controlled machine running under the same numerical control tape which originally machine the profile. The profile apparatus comprises a sensing head which is displaceable both along the axis of the apparatus and in a plane perpendicular thereto. The sensing head is biased and pre-loaded to follow the contour of the workpiece. Forces imposed on the sensing head by irregularities on the surfaces of the workpiece deflect the head either along an axis extending through the apparatus or in a plane of interrogation lying perpendicular thereto. Suitable force transmission means translate the forces exerted on the sensing head to forces acting on a shaft member that is mounted for axial displacement within the apparatus housing. The shaft is both rectilinearly and rotationally displaced and the magnitude of the displacement is recorded and displayed by suitable means. In addition to accurately measuring the workpiece contour, sensing heads able to locate bores within the workpiece, or to measure dimensions of the workpiece along the axis of the device are provided.

It is an object of this invention to provide a sensing device for making dimensional checks of a machined workpiece using the same machine tool spindle and control tape as that which is utilized to machine the profile. It is a further object to eliminate the high cost of present contour-checking methods by providing an apparatus mountable on the same numerically controlled machine tool which machined the contour to accurately check the profile. It is a still further object of this invention to provide an apparatus that is, at all times, movable both along an axis extending through the apparatus and in a plane perpendicular thereto without requiring manual switching to permit movement in one degree of freedom to the exclusion of the other. Other objects of this invention will become apparent in the detailed description of the device contained herein.

BRIEF DESCRIPTION OF THE DRAWINGS

The invention will be more fully understood from the following detailed description of the preferred embodiment, taken in connection with the accompanying drawings, in which.

DESCRIPTION OF THE PREFERRED EMBODIMENT

Figure 1:
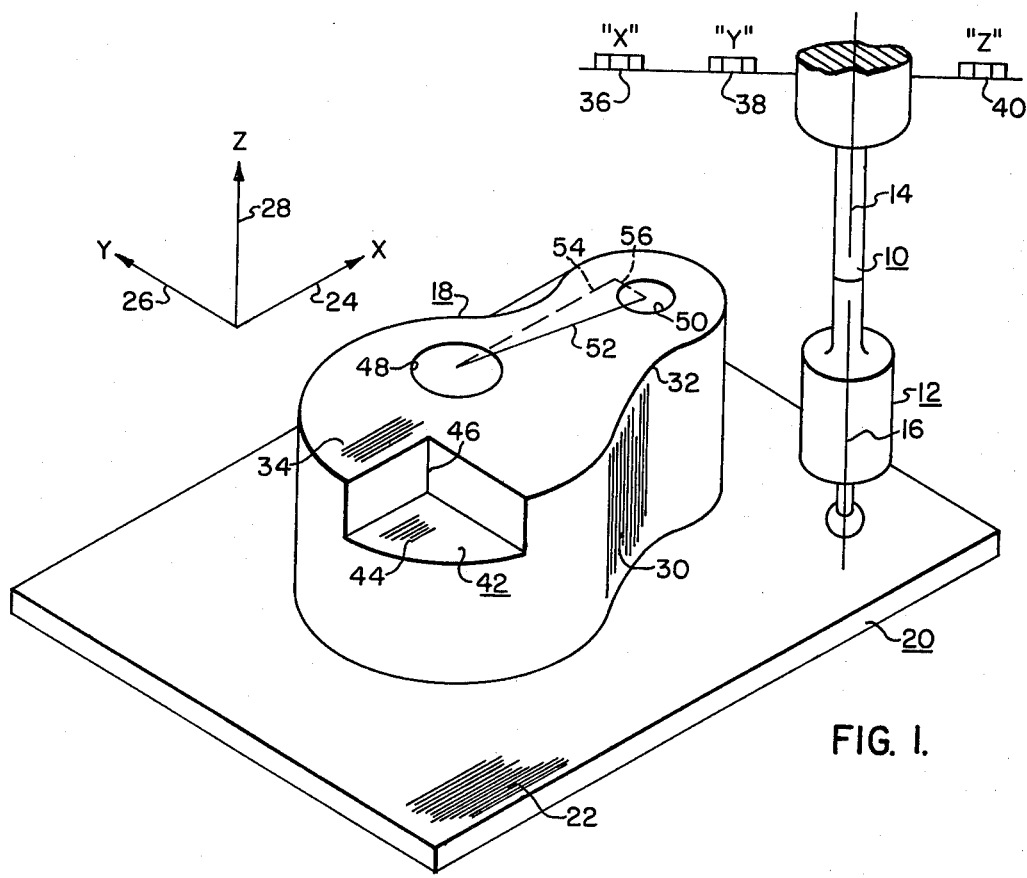
FIG. 1 is a perspective view of a machine tool spindle having mounted thereon a profile apparatus embodying the teachings of this invention.

Throughout the following description, similar reference characters refer to similar elements in all figures of the drawing.

Referring first to FIG. 1, a perspective view of a numerically controlled machine spindle 10 having a profile apparatus 12 taught by this invention attached thereon is shown. The spindle 10 has an axis 14 extending therethrough, the axis 14 of the spindle 10 being coincident with an axis 16 extending through the apparatus 12. The apparatus 12 provides an accurate interrogation and dimensional check of all the surfaces machined by the numerically controlled spindle 10 onto an irregularly shaped workpiece 18.

The workpiece 18 may be any machinable material which has been machined to a predetermined configuration by the numerically controlled spindle 10 having the appropriate cutting head disposed thereon. The workpiece 18, which may be utilized for a variety of purposes, such as the rotor end support for a dynamoelectric apparatus, is disposed upon a worktable 20, the same worktable 20 upon which the original machining operations have been performed. For purposes of definition, the surface 22 of the worktable 20 may be said to lie in a plane parallel to a plane defined by the X-axis 24 and the Y-axis 26 of a mutually orthogonal coordinate system. Extending in a direction perpendicular to a plane defined by the X-axis 24 and the Y-axis 26 is the Z-axis 28. As seen in FIG. 1, the Z-axis 28 is parallel to the coincident axes 14 and 16 extending through the spindle 10 and the apparatus 12 respectively, while the X-Y plane lies perpendicular to the coincident axes 14 and 16.

As viewed in FIG. 1, the workpiece 18 has disposed thereon an irregularly shaped contoured surface 30 which lies substantially parallel to the axis 16 of the apparatus 12, the edge 32 of the parallel-extending surface 30 defining an irregularly shaped, closed curve in the X-Y plane. The closed edge 32 defines a top surface 34 on the workpiece 18 that lies in a plane substantially perpendicular to the axis 16 of the apparatus 12. It is to be understood that both the parallel surface 30 and the perpendicular surface 34 have been provided on the workpiece 18 by the same numerically controlled spindle 10 which now holds the profile apparatus 12. The spindle 10 is movable in all three orthogonal directions, the magnitude of the displacement in each orthogonal direction being given by readout devices 36, 38, and 40 corresponding to the X-direction 24, the Y-direction 26, and the Z-direction 28, respectively. In addition to providing the parallel and perpendicular contour surfaces 30 and 34, respectively, the spindle 10 has machined a step or a notch 42 into the workpiece 18, the notch 42 separating the top surface 34 of the workpiece 18 from a parallel-extending surface 44, the surfaces 34 and 44 being separated by a predetermined displacement 46 extending in the Z-direction 28. Similarly, the machine tool spindle 10, having the appropriate cutting head thereon, has also provided a first and a second bore 48 and 50, respectively, through the workpiece 18. The bores 48 and 50 are located from each other a predetermined distance 52 in the X-Y plane, the distance 52 being resolvable into a predetermined distance 54 in the X-direction 24 and a predetermined distance 56 in the Y-direction 26.

In the prior art, it is difficult to provide an accurate check of the contours of the surfaces machined into a workpiece by a numerically controlled device. It is usually necessary to remove the machined workpiece away from its worktable and to obtain measurement of the contours and surfaces by extensive independent gauging setups. Also, there is not presently available a device which will permit inspection of surfaces extending both parallel and perpendicular to the spindle axis and provide accurate locational measurement of steps and bores machined into the machinable stock workpiece. Although U.S. Pat. No. 3,673,695 uses the same spindle and numerical control tape to check the dimensions as was used to machine them, the device therein shown is movable only along an axis or in a plane perpendicular thereto, movement in one direction excluding movement in the other. A manual switchover operation is therefore required.

The apparatus 12 taught by this invention provides a device able to accurately check contours and surfaces that extend parallel and perpendicular to the apparatus axis 16. The apparatus 12 provides free movement either along the axis 16 or in a plane perpendicular thereto, at all times, without the requirement of a manual switchover. Since the apparatus 12 is attached to the same machine tool spindle 10 which performed the original machining operations on the stock 14, it can therefore ascertain with precision whether the machine spindle 10 has accurately executed the instructions transmitted thereto by the numerical control tape. Such a dimension check is made by the apparatus 12 while the workpiece 18 is still on the same worktable 20 upon which the original cutting operations were performed (FIG. 1). Thus, accurate measurements may be taken without removing workpiece 18 away from either the machine spindle 10 or from the worktable 20. Also, interrogation of both the parallel surfaces 30 and the perpendicular surface 34 may be performed without manual switchover to permit motion of the apparatus from one direction to another. It is apparent that such an arrangement as that disclosed by this invention is more accurate, less costly, and more expeditious than the separate measurement operations and devices utilized heretofore in the prior art.

Figure 2:
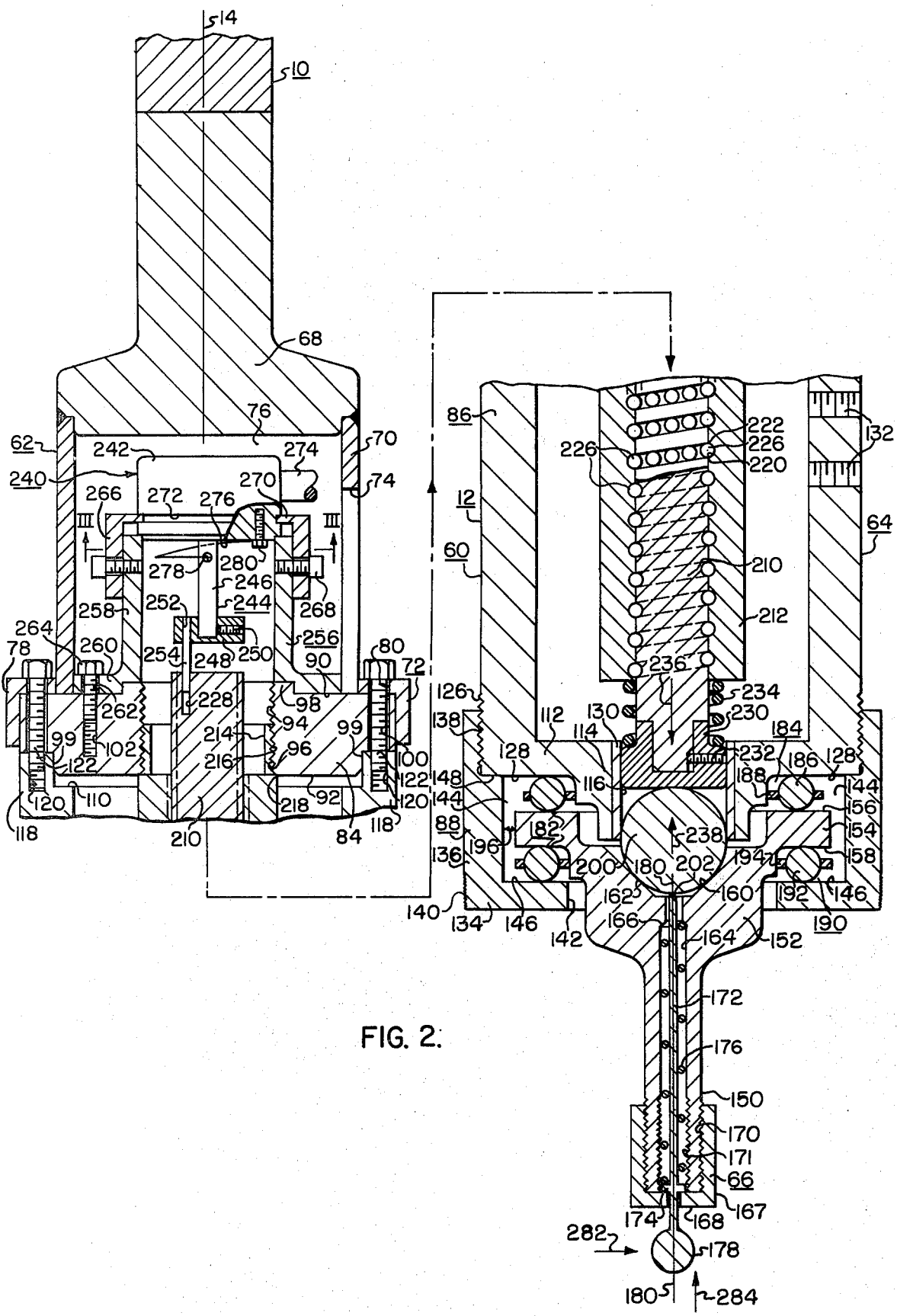
FIG. 2 is an elevational view, entirely in section, of a profile apparatus embodying the teachings of this invention.

Referring now to FIG. 2, an elevational view, entirely in section, of the profile apparatus 12 embodying the teachings of this invention is shown. As stated in connection with FIG. 1, the apparatus 12 is mounted on the spindle 10 so that the axis 16 and 14, respectively, extending through each are aligned coincident with the other. The apparatus 12 has a housing 60 which comprises a cap portion, generally indicated at reference numeral 62, an elongated cylindrical body portion, generally indicated at reference numeral 64, the body portion 64 being securely attached to the cap portion 62, and sensing means for interrogating the surfaces of the workpiece 18, the sensing means being generally indicated at reference numeral 66, the sensing means 66 being movable disposed relative to the body portion 64.

The cap portion 62 itself comprises a shank member 68 securely attached to a cylindrical tubular member 70. The tubular member 70 is in turn attached to a cup-like member 72. The shank 68 is securely received by the spindle 10 of the numerically controlled machine tool (FIG. 1). The tubular member 70 has an opening 74 disposed therein which permits communication between the exterior of the cap portion 62 a cylindrical volume 76 defined by the interior of the cap portion 62. The volume or cavity 76 provides a useful space for the disposition therein of measurement means, which comprise an element of the apparatus 12 and which will be discussed more fully herein. The cup-like member 72 has a sleeve 78 integral therewith and a plurality of openings 80 extending therethrough.

The body portion 64 comprises a cover plate 84, an elongated casing member 86, and a locking cap 88. The cover plate 84 is a flat disc-like member having a top surface 90, a bottom surface 92 and a central axis bore 94 extending therethrough. The bore 94 has threads 96 disposed therein. A ridge-like proturberance 98 extends from the top surface 90 of the cover plate 84 and circumferentially surrounds the threaded bore 94 extending therethrough while a shoulder 99 is disposed on the bottom surface 92 thereof. The cover plate 84 has an outer and an inner concentric array of openings 100 and 102, repsectively, therein. The outer openings 100 align with the openings 80 extending through the cup-like member 72 of the cap portion 62. The inner array of openings 102 are disposed adjacent the threaded bore 94 of the cover plate 84.

The casing member 86 is a hollow, substantially cylindrical member having a first end 110 and a second end 112. The second end 112 is constricted and defines a protruding neck 114. The neck 114 has an opening 116 extending therethrough. The opening 116 has a narrower diameter than the diameter of the first end 110 of the casing 86.

The casing 86 has extensions 118 disposed near the first end 110 thereof, the extensions 118 having openings 120 therein. The extensions 118 engage the shoulder 99 of the cover plate 84. The openings 120 in the extensions 118 align with openings 80 and 100 extending through the cup-like member 72 and the cover plate 84, respectively, and receive threaded bolts 122 to secure the cap portion 62 and the body porton 64 in the described assembled relationship.

Disposed externally on the sidewalls of the casing 86 adjacent the second end 112 thereof is a plurality of threads 126. A flat annular surface area 128 is disposed adjacent the neck 114. A substantially cylindrical bushing 130 is disposed within the constricted opening 116 extending through the neck 114. Threaded openings 132 are provided in the sidewalls of the casing 86 approximately midway between the ends 110 and 112.

The locking cap 88 is a substantially cup-shaped member having an annular base plate 134 and a cylindrical portion 136 integral therewith. The portion 136 has threads 138 disposed on the internal circumference thereof which engage threads 126 disposed on the external surface of the sidewall of the casing member 86 to securely affix the locking cap 88 to the casing member 86. In order to facilitate engagement of threads 126 and 138, a knurled surface 140 is provided on the external surface of the locking cap 88. The base plate 134 of the locking cap 88 has a central axial opening 142 extending therethrough. The interior of the locking cap 88 and the exterior surface 128 of the casing member 86 define a bearing chamber 144 therein. The interior surface 146 of the base plate 134 and the exterior surface 128 of the casing member 86 must be disposed so as to lie parallel to each other. In order to insure parallelism of the surfaces, a shoulder 148 is provided on the interior of the cylindrical portion 136. Engagement of threads 126 and 138 until the shoulder 148 engages the surface 128 of the casing member 86 insures the parallel relationship of the surfaces 128 and 146.

The sensing means 66 comprises an elongated probe member 150 having a flared base 152 thereon, the base 152 extending radially outward from the elongated probe member 150. The base 152 has an annular flange 154 integral therewith, the flange 154 having a top surface 156 and a bottom surface 158 thereon. The top surface 156 of the flange 154 is disposed so as to lie parallel to the surface 128 on the exterior of the casing member 86, while the bottom surface 158 of the flange 154 is disposed so as to lie parallel to the interior surface 146 of the locking cap 88. The base 152 has a scooped depression 160 therein, the sidewalls of the depression 160 being inclined at a 45° angle to the apparatus axis 16 and defines a frustoconical surface area 162 therewithin. The frustoconical depression 160 communicates with the opening 116 lined by the bushing 130. The elongated probe member 150 is mounted coaxially with the body portion 64 and has a central axial bore 164 extending completely therethrough. The bore 164 communicates with the frustoconical depression 160. The bore 164 has a shoulder 166 disposed near the upper end thereof, as viewed in FIG. 2. A cap 167 having a ledge 168 disposed near the lower end thereto is threadedly attached by external threads 170 to the elongated probe 150. Internal threads 171 are provided in the bore 164 near the lower end thereof, as shown in FIG. 2.

An elongated pin member 172 is mounted for movement within the bore 164 of the probe member 150. The pin member 172 has a shoulder 174 thereon, the shoulder 174 being biased in an abutting relationship with the ledge 168 by a spring 176 disposed within the bore 164 between the shoulder 166 and the shoulder 174. The pin 172 extends through an opening in the cap 167 and terminates in a probe tip 178. The tip 178 is adapted for friction wear and is therefore fabricated from a heat-treated, friction-resistant material, such as carbide. The upper end of the pin 172, as seen in FIG. 2, extends up to the depression 160 in the base 152. The pin 172 has an axis 180 extending therethrough, the axis 180 being shown, in FIG. 2, as being coincident with the axis 16 extending through the apparatus 12.

The flared base 152 extends through the opening 142 in the locking cap 88 and is disposed such that the flanges 154 thereon are disposed within the bearing chamber 144 within the locking cap 88.

Means 182 for permitting the probe member 150 to be displaced relative to the body portion 64 are provided. The means 182 comprise a first bearing arrangement 184 comprising a plurality of balls 186 mounted in an annular ball support matrix 188. The first bearing arrangement 184 is disposed in the bearing chamber 144 between the parallel extending outer surface 128 of the casing member 86 and the top surface 156 of the flange 154. Similarly, a second bearing arrangement 190, comprising a plurality of balls 192 and an annular support matrix 194 are disposed within the bearing chamber 144 between the parallel extending surfaces 158 in the flange 154 and the internal surface 146 of the locking cap 88. The means 182 permit the probe member 158 to displace relative to the body portion 64 in a plane extending perpendicular to the axis 16 of the apparatus 12, that is, to the right or to the left, as seen in FIG. 2, within the bearing cavity 144 within the locking cap 88. Thus, the axis 180 of the pin 172 is able to be removed away from its coincident alignment with axis 16 of the apparatus 12. There is a predetermined clearance 196 of approximately 60 mils between the interior sidewalls of the locking cap 88 and the side edges of the flanges 154. Thus, as the axis 180 is removed from coincidence with axis 16, the flange 154, and therefore the elongated probe member 150, is permitted to be displaced in a plane perpendicular to the axis 16 of the apparatus. Also, the pin 172 is displaceable along the axis 16. The response of the sensing means 66 to forces exerted thereon as the apparatus 12 interrogates the parallel surface 30 and the perpendicular surface 34 of the workpiece 18 (FIG. 1) will be described more fully herein.

Disposed within the temperature 160 in the base 152 is a spherical member 200. The spherical member 200 extends into the bushing 130 lining the opening 116. The upper end of the pin member 172 abuts against the spherical member 200, as shown by numeral 202. It is therefore apparent that any displacement of the axis 180 the probe member 150 away from the axis 16 of the apparatus 12 due to a force being exerted thereon would be transmitted into the spherical member 200. Similarly, any displacement of the pin member 172 along the axis 180 thereof would also be transmitted into the spherical member 200. Thus, due to the abutment of either the 45° inclination of the frustoconical surface area 162 or of the pin 172 with the spherical member 200, forces exerted on the probe tip 178 are imposed upon the spherical member 200, causing that member to be displaced upward (in FIG. 2) within the bushing 130.

Extending along the apparatus axis 16 and centrally through the body portion 64 is an elongated shaft 210. The shaft 210 is axially surrounded by a jacket 212. The jacket 212 has elongated extensions 214 having threads 216 thereon. The threads 216 engage the threads 96 disposed within the bore 94 of the cover plate 84. Threads 216 and 96 are engaged until the bottom surface 92 of the cover plate 84 and a shoulder 218 on the jacket 212 are in abutting contact. The jacket 212 has a spherical channel 220 disposed about the internal axial surface thereof. The shaft 210 has a corresponding spiral channel 222 disposed therein. The alignment of the channels 220 and 222 on the jacket 212 and the shaft 210, respectively, define a spiral circular bearing channel or keyway in which are disposed a plurality of ball bearings 226. The low frictional ball bearings 226 permit any force transmitted to either end of the shaft 210 to cause the shaft 210 to be displaced both rectilinearly and rotationally relative to the axis 16. Thus, for example, a force imposed upon the lower end, as viewed in FIG. 2, of the shaft 210 causes the shaft 210 to be displaced both rectilinearly and rotationally with respect to axis 16.

The shaft 210 has an eccentric opening 228 disposed in the upper end thereof. The shaft 210 has an adapter 230 secured to the lower end thereof by a set screw 232. A bias spring 234 is disposed between the jacket 212 and the adaptor 230 and exerts a force on the adapter 230 acting in direction 236.

The spring force 236 acts on the probe member 150 through the spherical member 200 in a direction which tends to urge the axis 180 of the probe member 150 and the pin member 172 to remain coincident with the axis 16 extending through the apparatus 12. Since the probe member 150 is displaceable relative to the body portion 64 in a plane perpendicular to the axis 16 due to the provision of the means 182, and since the pin 172 is displaceable within the probe member 150 along the coincident axes 16 and 172, it is to be appreciated that any displacement is against the force of the spring 234 acting in direction 236. Conversely, forces directed either along the axis 16 of a plane perpendicular thereto are imposed upon the sensing means 66, such forces will be transmitted through the spherical member 200 into the shaft 210. The spherical member 200 responds to forces thereon by moving upward, against the force 236 of the spring 234, and will impart a force acting in direction 238 on the lower end edge of the shaft 210 which will displace the shaft 210 both rectilinearly and rotationally about the axis 16.

It is apparent that if the probe tip 178 were moved over the surfaces of the workpiece 18, imperfections in that surface would impose varying forces acting on the tip 172. Depending upon the surface over which the tip 172 is traversed, forces acting in a plane perpendicular to the axis 16 (due to imperfections on the parallel surface 30) or forces acting along the axis 16 (due to imperfections on the perpendicular surface 34), are imposed on the tip 172. And, it is seen that an arrangement such as that described herein will permit the sensing means 66 to respond to such forces. It is to be noted that no manual switching is required to permit the sensing means 66 to displace in the direction along the axis 16 as opposed to the direction in a plane perpendicular thereto. The sensing means 66 is at all times displaceable either along the axis 16 of the apparatus 12, or in a plane perpendicular thereto.

The apparatus 12, as a further element comprises means 240 mounted within the volume 76 disposed within the housing 60 and cooperatively associated with the shaft 210 for determining the magnitude of the displacement of the shaft 210.

The indicating means 240 in FIG. 2 comprises a rotary resolver 242, such as that manufactured by the Spalding Company. The resolver 242 utilizes the rotational displacement of the shaft 210 as its input. The rotary resolver 242 is coupled to the shaft 210 by suitable linkage generally indicated at 244. More specifically, the resolver 242 has an axially extending shaft 246, having mounted thereon an adaptor 248, the adaptor 248 being securely fastened to the shaft 246 by set screw 250. Eccentrically disposed within the adaptor 248 is an opening 252, the opening 252 receiving a dowel pin 254. The dowel pin 254 is received by the eccentrically disposed opening 228 provided in the upper end of the displaceable shaft 210.

When using the rotary resolver 242, a suitable mounting bracket 256 is utilized on which to mount the rotary resolver 242 within the cavity 76. The mounting bracket 256 comprises a tubular portion 258 having a flange 260 thereon. The flange 260 has a plurality of openings 262 therein. The openings 262 align with the inner array of openings 102 extending through the cover plate 84 and receive threaded bolts 264 which secure the mounted bracket 256, and therefore the rotary resolver 242, within the cavity 76. A cup-shaped member 266 is securely mounted to the tubular portion 258 by bolts 268. The cup 266 has short lip portion 260 thereon, the lip 270 engaging a slot 272 which extends circumferentially about the rotary resolver 242. Thus, the lip 270 and the slot 272 combine to secure the rotary resolver 242 to the mounting bracket 256. An output lead 274 extends from the rotary resolver 242 out of the cavity 76 through the opening 74 disposed in the cap portion 62. The lead 274 extends to a suitable display device (not shown). In order to bias the pin 254 within the opening 228, the shaft 246 of the resolver 242 is biased by a flat spring 276.

Figure 3:
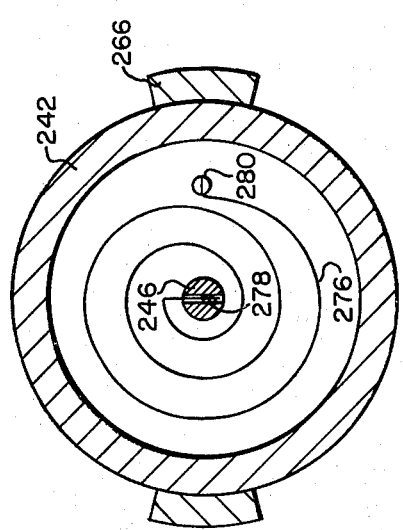
FIG. 3 is a sectional view of a portion of a profile apparatus taken along section lines III—III of FIG. 2.

Referring to FIG. 3, a sectional view taken along section lines III—III of FIG. 2 is shown. In FIG. 3, portions of the cup 266 and the rotary resolver 242 are shown in section. The shaft 246 has disposed therein a bore 278. One end of the flat spring 276 is engaged within the bore 278 while the second end is secured to the rotary resolver 242 by a set pin 280.

In operation, the hereinbefore described apparatus 12 is mounted onto the spindle 10 of the machine tool and traversed about the parallel and perpendicular surfaces, 30 and 34 respectively, of the workpiece 18. Irregularities and imperfections in the workpiece 18 impose forces on the probe tip 178. For example, if the probe tip 178 is interrogating the parallel surface 30 (FIG. 1) of the workpiece 18, deviations from the predetermined contour on that surface will impose a force acting in direction 282 (FIG. 2) on the sensing means 66. The force 282 tends to displace the sensing means 66 relative to the housing on the means bearing 182. The coincidence of axes 180 and 16 is this disrupted, and the force 282 is transmitted through the spherical member 200 into the shaft 210. The shaft 210 responds by displacing axially. The magnitude of the axial displacement of the shaft 210 is indicated by the indicating means 240, in FIG. 2, the rotary resolver 242, which thereby indicates the magnitude of the deviation on the parallel surface 30. The probe tip 178 is initially preloaded against the force of the spring 234 to insure that it will follow both protrusions and depressions during interrogation of the parallel surface 30.

Similarly, if the probe tip is traversed over the perpendicular surface 34 (FIG. 1) imperfections on that surface impose forces, such as 284, which act to displace the pin member 172 along the axis 16. Such movement is directly transmitted by the pin 172 into the spherical member 200. Similar to the previous description, the displacement of the shaft 210 is monitored by the rotary resolver 242, and the magnitude of the deviation on the perpendicular surface 34 is ascertained.

In addition to providing a device for ascertaining the contour of either the perpendicular or parallel surfaces of the workpiece 18, the dimensions of steps, such as step 42 (FIG. 1) may be ascertained.

To ascertain the magnitude of the step 42 (FIG. 1) first, the valve of the Z readout 40 (FIG. 1) is recorded as the tip 172 just abuts against the perpendicular surface 34. The spindle 10, having the apparatus 12 therein, is then displaced in the Z-direction 28, until the tip 178 is brought into abutting contact with the surface 44. The machine tool spindle 10 continues to move in the Z-direction 24 until the abutting contact between tip 178 and surface 44 exerts a force thereon which deflects the shaft 210 to exactly the same magnitude as the shaft 210 was deflected by contact with the top perpendicular surface 34. The magnitude 42 (FIG. 1) of the step 36 can then be accurately ascertained merely by subtracting the value of the numerical control readout 40 taken when the abutment between the surface 34 and the tip 178 was established, and subtracting therefrom the magnitude of the readout 40 when the abutment between the tip 178 and the planar surface 44 is established. This will accurately give the dimension 46 in the Z-direction 28 of the step or notch 42 (FIG. 1).

Figure 4:
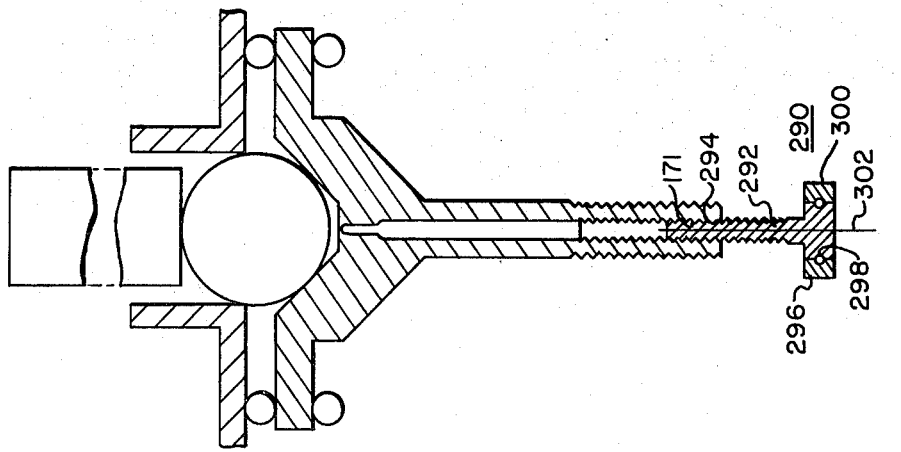
FIG. 4 is an elevational view of an alternate probe tip for the sensing means for use on a surface of a workpiece disposed parallel to the axis of an apparatus embodying the teachings of this invention.

Other sensing heads, instead of the pin 172, may be utilized on the probe member 150. Referring to FIG. 4, if only the parallel surface 30 of the workpiece is to be traversed, a probe tip 290 may be used.

In FIG. 4, the roller type sensing head 290 comprises a shaft 292 having threads 294 thereon. The threads 294 engage the internal threads 171 disposed on the elongated probe member 150. A disc portion 296 is disposed integral with the shaft 292 and a bearing member 298 is disposed between the disc 296 and an annular ring 300 threaded onto the external surface of the disc 296. Thus, the ring 300 rotates on bearing 298. The ring 300 is provided to give a greater diametrical dimension to the disc 296 as measured from a central axis 302 of the shaft 292.

Figure 5:
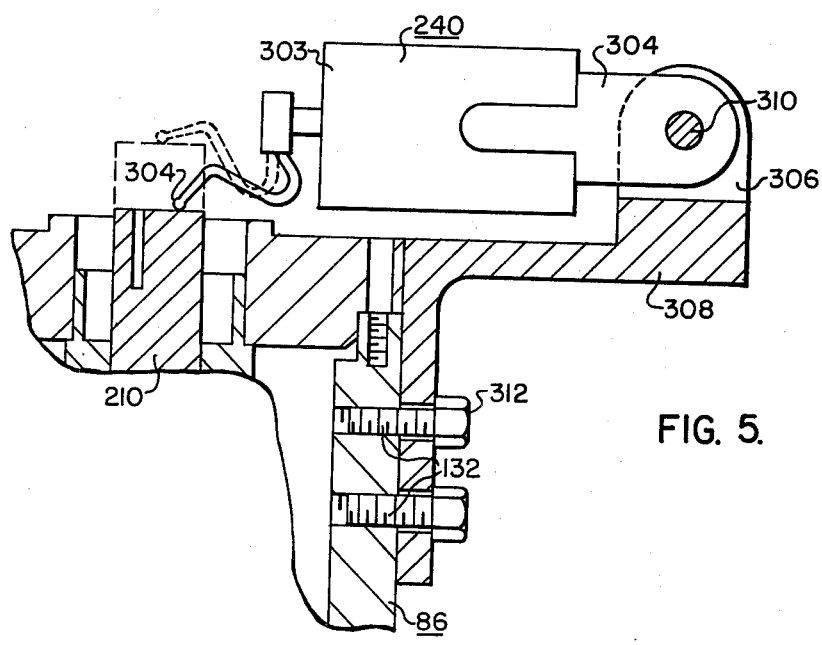
FIG. 5 is an elevational view of a mounting for an alternate recording arrangement utilized by a profile apparatus embodying the teachings of this invention.

Alternate indicating means 240 may be used with the apparatus 12. In FIG. 5, a device 303 utilizing the rectilinear displacement of the shaft 210, as opposed to rotational displacement used by the rotary resolver 242, is shown. The rectilinear device 303, such as a brush recorder, has a sensor element 304 affixed to the upper end of the shaft 210. The device 303 is securely mounted on a support arm 304 which is itself engaged in the clevus arms 306 of a mounting bracket 308 by a pin 310. The bracket 308 is itself mounted by bolts 312 to the openings 132 disposed in the sidewall of the casing member 86.

Figure 6:
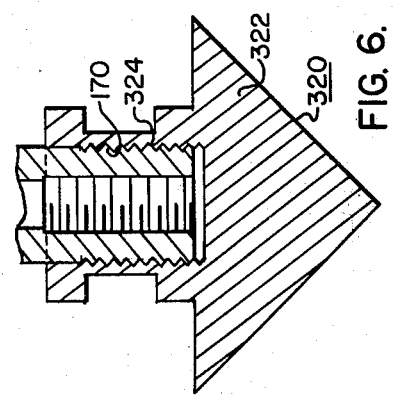
FIG. 6 is a view of an alternate probe tip for the sensing means for locating bores positioned in a workpiece; and, FIG. 7 is a view illustrating measurement of hole locations using the probe tip of FIG. 6 on an apparatus embodying the teachings of this invention.

The probe member 150 may also dispose a hole locating sensing head 320 thereon. Referring now to FIG. 6, the hole locator sensing head 320 comprises a conical portion 322 securely fastened by threads 324 to the external threads 170 of the probe member 150. The conical head 322 has sides thereon sloped at a 45° angle. Disposition of such a hole locator head 320 can accurately determine whether holes, such as bores 48 and 50 (FIG. 1), have been accurately placed in the workpiece 14.

Figure 7:
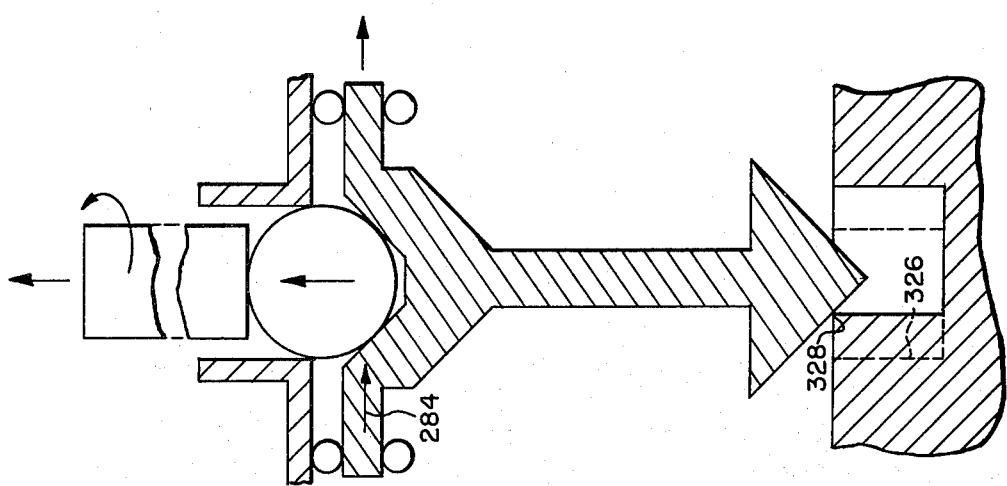

Referring to FIGS. 6 and 7, the hole locator head 320 is utilized as follows. In FIG. 7, assume that the proper location of the bore 48 in the workpiece 18 is given by the dotted lines 326. However, the actual machining has located the bore 48 as shown in FIG. 7. Since the same numerical control tape which ordered the spindle 10 to drill the holes now orders the spindle 10 to move the head 320 over the expected location of the bore 48. Thus, the readouts 36 and 38 will position the spindle 10 to the coordinates of the bore 48. The numerical control will order the spindle 10 to lower itself, and therefore the head 320, to the bore 48. If the bore has been mislocated, a protruding edge 328 will abut the head 320 at a point in the downstroke of the spindle 10 before the expected point of contact had the bore 48 been located correctly. This abutment between the shoulder 328 and the hole locator head 320 exerts a force acting in direction 284 on the spherical member 200. As previously described, the spherical member 200 transmits the force 284 and exerts a force on the shaft 210 acting in direction 238, which is indicated by the means 240. If, in FIG. 7, the means 240 comprise the device shown in FIG. 5, the shaft 210 would displace upward to indicate the imposition of forces on the shaft 210 on an external display (not shown).

Thus, if the shaft 210 has been deflected (as indicated by the display) before the Z-readout 40 indicates that the bore, has been reached, the bore 48 has been mislocated. Of course, if the Z-readout 40 corresponds to the value directed by the numerical control tape before the hole locator head 320 is deflected, the bore 48 has been properly placed. Of course, other readout devices, such as a simple dial indicator, may be used to indicate premature abutment of the locator head 300.

The hole locator 320 may also be used to determine the distance 52 between bores 48 and 50 (FIG. 1). One of the bores is given as the reference value, and the locator 320 is moved by the spindle 10 so that abutting contact between the bore (assume bore 48) and the locator 320 is established. All readouts 36, 38 and 40 and the dial indicator are then "zeroed."

The numerical control tape then initiates the spindle 10 to withdraw from the bore 48, thus the Z-direction readout 34 will register a value other than zero. The spindle 10 is then displaced in the X-direction 24 along the path 54 and along the Y-direction 26 on the path 56 until the values of the X-readout 35 and the Y-readout 38 corresponds to the coordinates of the second bore 50, using the bore 48 as the origin. The spindle 10 then lowers the locator head 320, the Z-readout 40 decreasing as the locator 320 moves downward. If the bore 50 is properly located, the dial indicator will deflect as the Z-readout 40 reaches zero. Of course, if bore 50 is misplaced, there will be a deflection of the measurement display before the Z-readout 40. In a manner similar to that described in connection with the location of a bore, the indication is given that the bore has been misplaced.

In summary, it can be appreciated that the apparatus described herein permits accurate measurement of all surfaces of a machined member. The apparatus permits movement either along an axis of in a plane perpendicular thereto, without requiring manual switchover from motion in one direction to another. The apparatus permits varied functions, in addition to ascertaining contour deviations, such as hole location, to be carried out. The apparatus is simple to fabricate, and the coaxial arrangement of parts described herein is less susceptible to inaccuracies due to manufacturing errors. In addition, the apparatus can utilize a varied assortment of indicators, mounted directly therein, for indicating the displacements and deviations ascertained.

We claim as our invention:

1. An apparatus having an axis extending therethrough for indicating the contour of a member having a surface disposed perpendicular to the axis and a surface disposed parallel to the axis, said apparatus comprising:
    a housing having an opening therein,
    sensing means for interrogating both the perpendicular and the parallel surfaces of the member, said sensing means comprising,
    a probe member coaxially mounted within said housing and extending through the opening therein,
    means disposed within said housing for permitting movement of said probe member relative to said housing in a plane perpendicular to the apparatus axis,
    a pin member mounted for movement within said probe member along the apparatus axis, said pin member terminating in a probe tip,
    said pin member being displaced along the apparatus axis in response to a force exerted on said probe tip by a deviation on the perpendicular surface of the member as said probe tip is moved thereover,
    said probe member being displaced relative to said housing the plane perpendicular to the apparatus axis in response to a force exerted on said probe tip by a deviation on the parallel surface of the member as said probe tip is moved thereover,
    a shaft member mounted coaxially within said housing and displaceable along the apparatus axis,
    force transmission means for transmitting forces imposed upon said sensing means to said shaft member to displace said shaft member from a first to a second position along the apparatus aixs, said shaft member being mounted for simultaneous rectilinear and rotational displacement relative to the apparatus axis in response to a force transmitted thereto by said force transmission means, and,
    means for indicating the magnitude of the displacement of said shaft member to indicate the magnitude of the deviation encountered by said sensing means on the surface of the member.

2. The apparatus of claim 1, wherein said indicating means is activated by the rectilinear displacement of said shaft member.

3. The apparatus of claim 1, wherein said indicating means is activated by the rotational displacement of said shaft member.

4. The apparatus of claim 1, wherein:
    said probe member has a base portion thereon disposed within the casing, said base portion having a depression therein, and,
    said force transmission means is mounted coaxially within said housing and composes a spherical member abutting against said shaft member and disposed within said depression in said base portion.

5. The apparatus of claim 4, wherein said depression has a frustoconical surface sloped at 45° relative the the apparatus axis.

6. The apparatus of claim 5, wherein:
    said base portion has a flange integral therewith, and, wherein said means for permitting movement of said probe member within said housing comprises a bearing member disposed between said flange and said housing to permit movement of said probe member relative to said housing in a plane perpendicular to the apparatus axis.

* * * * *